(12) United States Patent
Hurtado

(10) Patent No.: US 8,806,750 B2
(45) Date of Patent: Aug. 19, 2014

(54) FORCED OSCILLATION SEALS FOR AIR TO GAS LEAKS REDUCTION IN REGENERATIVE AIR PREHEATERS

(76) Inventor: Fernando Treviño Hurtado, Nuevo León (MX)

( * ) Notice: Subject to any disclaimer, the term of this patent is extended or adjusted under 35 U.S.C. 154(b) by 291 days.

(21) Appl. No.: 13/359,316

(22) Filed: Jan. 26, 2012

(65) Prior Publication Data

US 2013/0192041 A1    Aug. 1, 2013

(51) Int. Cl.
*B23P 15/26* (2006.01)

(52) U.S. Cl.
USPC ........... 29/890.034; 29/890.03; 165/8; 165/9; 277/355; 277/553; 277/644

(58) Field of Classification Search
CPC .... F02G 1/057; F28D 19/047; F16J 15/3212; F16J 15/3208; F16J 15/122; F16C 33/74; G16J 15/0887
USPC ......... 29/890.03, 890.034; 165/8, 9; 277/355, 277/553, 644, 654
See application file for complete search history.

(56) References Cited

U.S. PATENT DOCUMENTS

| | | | | |
|---|---|---|---|---|
| 2,549,583 | A * | 4/1951 | Eckersley | 165/5 |
| 3,631,582 | A * | 1/1972 | Lucas et al. | 29/419.1 |
| 4,408,659 | A | 10/1983 | Hermanns et al. | |
| 4,673,026 | A | 6/1987 | Hagar et al. | |
| 4,791,980 | A * | 12/1988 | Hagar et al. | 165/9 |
| 4,804,195 | A | 2/1989 | Parker | |
| 4,940,080 | A | 7/1990 | Reeves et al. | |
| 4,997,028 | A * | 3/1991 | Townsend | 165/9 |
| 5,005,634 | A * | 4/1991 | Reeves et al. | 165/9 |
| 5,038,849 | A | 8/1991 | Hagar | |
| 5,363,903 | A | 11/1994 | Hagar | |
| 5,564,255 | A | 10/1996 | Giacomelli | |
| 5,881,799 | A | 3/1999 | Kozacka et al. | |
| 5,950,707 | A | 9/1999 | Kozacka et al. | |
| 6,789,605 | B1 | 9/2004 | Kaser | |
| 7,059,386 | B1 * | 6/2006 | Kaser | 165/9 |
| 7,231,958 | B1 * | 6/2007 | Kaser et al. | 165/9 |
| 7,416,016 | B1 | 8/2008 | Kaser | |

(Continued)

FOREIGN PATENT DOCUMENTS

| | | |
|---|---|---|
| MX | 2009004098 A | 10/2009 |
| WO | 9106819 A1 | 5/1991 |
| WO | 9503518 A1 | 2/1995 |
| WO | 9609965 A1 | 4/1996 |
| WO | 9701733 A1 | 1/1997 |
| WO | 9741391 A1 | 11/1997 |
| WO | 9749941 A1 | 12/1997 |
| WO | 2011025558 A1 | 3/2011 |

*Primary Examiner* — Richard Chang
(74) *Attorney, Agent, or Firm* — Matthew J. Lattig; Charter IP, LLC

(57) ABSTRACT

A forced oscillation radial seal is described for regenerative air preheaters which contain rotatable radial plates having upper and lower edges. The forced oscillation seal includes a base with a first portion attached to a lateral face of the plates adjacent the upper and lower edges, and a second free portion, with a pivot system having an axis attached to the second free portion, and a rigid sealing sheet with a first free portion, second portion, and central portion, the sealing sheet attached at its central portion to the pivot system. The forced oscillation seal includes a counterweight attached to the sealing sheet so the sealing sheet reassumes a vertical position after forming a seal with a sealing surface, and a plurality of springs in contact with the sealing sheet and base along the axis of the pivot system, which cooperate with the counterweights to force the seal to oscillate.

5 Claims, 6 Drawing Sheets

(56) References Cited

U.S. PATENT DOCUMENTS

| | | | |
|---|---|---|---|
| 8,191,313 B2 * | 6/2012 | Ito et al. | 49/181 |
| 8,448,385 B2 * | 5/2013 | Brewster et al. | 49/503 |
| 8,490,903 B2 * | 7/2013 | Chen | 241/36 |
| 8,627,871 B2 * | 1/2014 | Aquilina | 160/188 |
| 2009/0145574 A1 * | 6/2009 | Klisura | 165/8 |
| 2010/0181043 A1 | 7/2010 | Mueller et al. | |
| 2011/0036536 A1 | 2/2011 | Klisura et al. | |
| 2011/0037236 A1 | 2/2011 | Klisura et al. | |
| 2011/0048670 A1 | 3/2011 | Podhorsky et al. | |

* cited by examiner

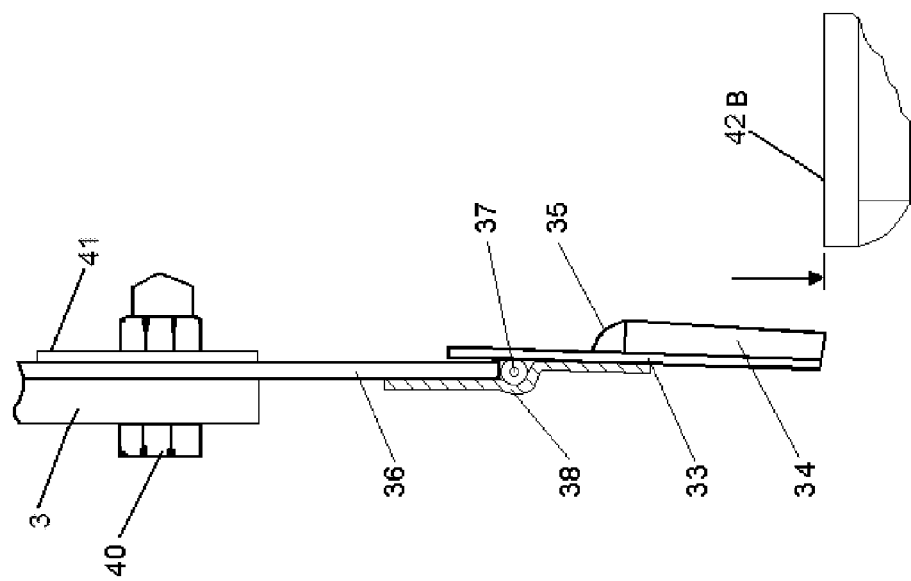
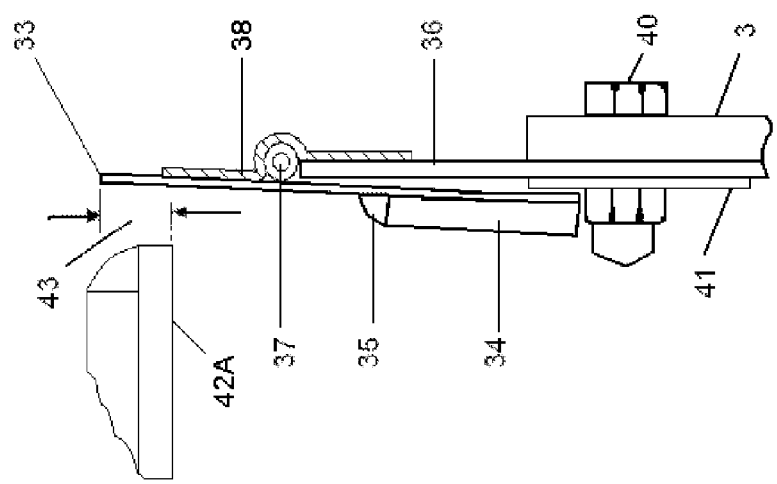
FIG. 6
FIG. 7

FORCED OSCILLATION SEALS FOR AIR TO GAS LEAKS REDUCTION IN REGENERATIVE AIR PREHEATERS

BACKGROUND

1. Field

The example embodiment is related in general to auxiliary equipment for industrial boilers such as regenerative air preheaters. More particularly the example embodiment is directed to a forced oscillation seal to prevent leaks of air to gas in these preheaters.

2. Related Art

A regenerative air preheater is heat recover equipment which transfers part of the heat from the combustion products (gases) produced during boiler operation to the air that is introduced to the boiler firebox through air ducts, so as to provide a hot air stream with a temperature that is higher than the environmental air. By using such recovering equipment, it is possible to achieve savings in the fuel consumption equal to the recovered heat, thus making it possible to recover the investment in the regenerative air preheater in a single year, in full capacity operation, or in 1.5 years when the preheater works under normal operating conditions.

Regenerative air preheaters are rotative heat exchangers with moving parts, one of which being its rotor. The rotor includes a plurality of heat transfer elements, called baskets. The rotor is also formed by segmented plates referred to as diaphragms, where the traditional or radial seals are arranged. These seals function to seal the polished surface of the ends of the plates/diaphragms, which are used to separate the gas side from the air side, and prevent the leaks or leakage of air to the hot combustion gas flowing in the opposite side. These air leaks cause an increase in power consumption of the forced draft fan (e.g., equipment that drives the air for the combustion through the regenerative air preheater), such that the industrial boiler cannot reach its full generation capacity, due to the lack of air when the air leaks are so high. Typically, regular or normal leaks range between 7% and 10%, and high leaks range between 11% and 35%.

U.S. Patent application No. 2009-0145574 discloses a seal for what is known as a Ljungstrom preheater of the prior art. The radial seals are made of a flexible material. However, such seals represent a high movement resistance between the rotor and a rotor drive unit, increasing the load and risk.

SUMMARY

An example embodiment is directed to a forced oscillation radial seal to prevent leaks of air stream to a gas stream in regenerative air preheaters containing rotatable radial plates having upper and lower edges. The forced oscillation seal includes a base with a first portion and a second free portion, the first portion fixedly attached to a lateral face of the plates adjacent to their upper and lower edges, a pivot system having an axis attached to the second free portion of the base, and a rigid sealing sheet with a first free portion, an opposite second portion, and a central portion, the rigid sealing sheet attached at its central portion to the pivot system. The forced oscillation seal includes a counterweight attached to the rigid sealing sheet so that the rigid sealing sheet reassumes a vertical position after forming a seal with a sealing surface, and a plurality of springs in contact with the rigid sealing sheet and the base along the axis of the pivot system that cooperate with the counterweights to force the seal to oscillate.

BRIEF DESCRIPTION OF THE DRAWINGS

FIG. 6 is a side view of the forced oscillation seal upper side of a vertical or vertical inverted preheater, on its position and illustrating its typical calibration.

FIG. 7 shows a side view of the forced oscillation seal lower side of a vertical or vertical inverted preheater, on its position and illustrating its typical calibration.

DETAILED DESCRIPTION

As to be shown and described hereafter, the example embodiment is directed to a forced oscillation radial seal to prevent or eliminate radial leaks in a regenerative air preheater, a method of preventing radial leaks in the preheater, and a method of reconditioning the preheater. The radial leaks may be eliminated on both the cold and hot sides of the regenerative air preheaters used in industrial boilers of steam generation and energy generation, so as to decrease fuel consumption during heat recovery of the combustion products in the boiler.

The inventor has been a regenerative air pre-heaters designer since 1980, so the seals that have been developed and which are to be fully described hereafter in accordance with the example embodiment are useful for these kind of regenerative air preheaters, also called Ljungstrom preheaters as previously referred to in the Background.

With the use of the example forced oscillation seals to be described hereafter, radial leaks are prevented in regenerative air preheaters by providing a forced oscillation seal that is always in contact with the polished surface. This eliminates any gap that could be formed in the passage from the air stream to the gas stream, despite deformations in the plates/diaphragms that take place during normal operation of the preheater in the boiler system.

Figure 1:
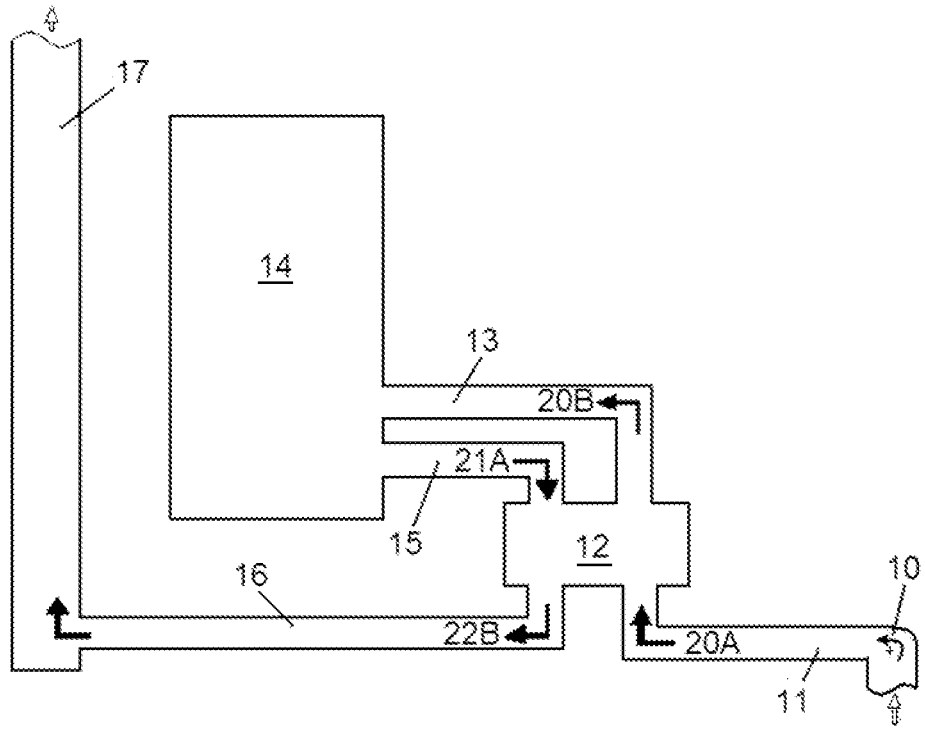
FIG. 1 is a system diagram of a prior art boiler system which includes a preheater of air for combustion.

PARTS LIST 3 plate/diaphragm
10 fan
11 cold air duct
12 preheater
13 hot air duct
14 boiler furnace
15 hot gas duct
16 relative cold gas duct
17 stack
18 air section
19 gas section
20A cold air stream
20B hot air stream
21A hot gas stream
21B lower hot gas stream
22B relative cold gas stream
22 polished center section 23 leaks
24 radial upper, lower seals
25 rotor post seals
26 circumferential seals
27 axial seals
28, 29 lower, upper bearings
30 cold condition
31 hot condition
32 clearance
33 rigid sealing sheet
34 counterweight
35 counterweight attaching means
36 base
37 pivot system
38 springs
39 forced oscillation seal
40 screws and nuts
41 holding strip
42 sealing surface
42A upper sealing surface
42B lower sealing surface
43 interference
44 cold condition
45 hot condition FIG. 1 is a system diagram of a prior art boiler system which includes a preheater of air for combustion. In FIG. 1, there is depicted a complete boiler system including a vertical regenerative preheater 12, a fan 10 (which may be axial or centrifugal to provide air (combustion air) to the system), a cold air duct 11 of a cold air stream 20A to the preheater 12, which will receive the cold air stream 20A, a hot air duct 13 for a hot air stream 20B that goes to the boiler's furnace 14 for the combustion with the fuel that is applied, and a hot gas duct 15 that comes from the boiler conducting a hot gas stream 21A flow. The hot gas stream 21A flow passes through the preheater 12 to transfer the heat form the hot gas to the cold air, heating the cold air stream 20A. This is why the preheater 12 is called regenerative. A relative cold gas duct 16 conducts a relative cold gas stream 22B at a temperature of around 320 for exhaust through a stack 17.

Figure 2:
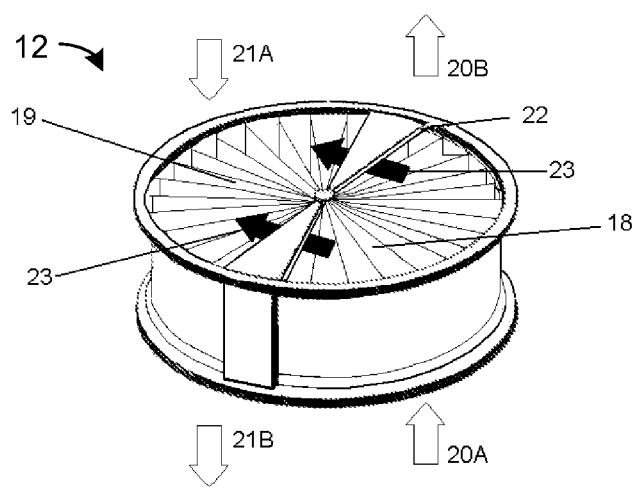
FIG. 2 is a perspective view of a prior art vertical preheater.

FIG. 2 shows a prior art vertical regenerative preheater, such as is generally portrayed in the system diagram of FIG. 1. FIG. 2 is provided to show the sealing surface were the radial leaks of the air to gas stream take place. The cold air stream 20A is introduced in the vertical preheater 12 through air section 18, and a hot air stream 20B is obtained. Likewise, a hot gas stream 21A is introduced in the vertical preheater 12 through gas section 19 and a lower hot gas stream 21B is obtained. Sections 18 and 19 are separated by a polished center section 22 having a horizontal sealing surface in which there are provided radial seals 24 in every plate (also known as a diaphragm). Hereafter, plate and diaphragm may be used interchangeably.

Figure 3:
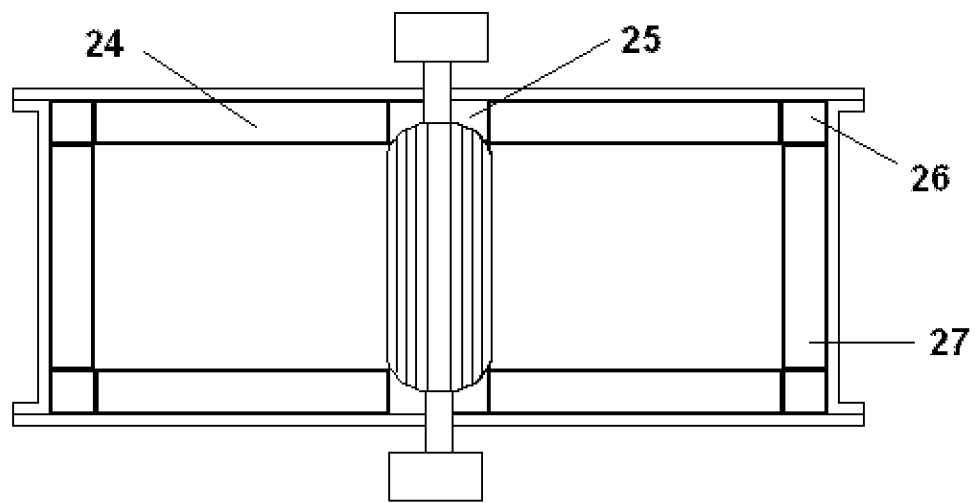
FIG. 3 is a cutaway view of the seals present in the prior art regenerative vertical type preheater.

FIG. 3 is a cutaway view of the seals present in the prior art regenerative vertical type preheater. Particularly, FIG. 3 is provided to show the seals present in a prior art preheater. The seals consist of radial upper and lower seals 24 placed on the upper and lower edges of the plates (diaphragms), rotor post seals 25, circumferential seals 26, and axial seals 27. The forced oscillation seals of the example embodiment to be described in detail hereafter correspond to and are a vast improvement over the prior art upper and lower seals 24 of FIG. 3.

Figure 4:
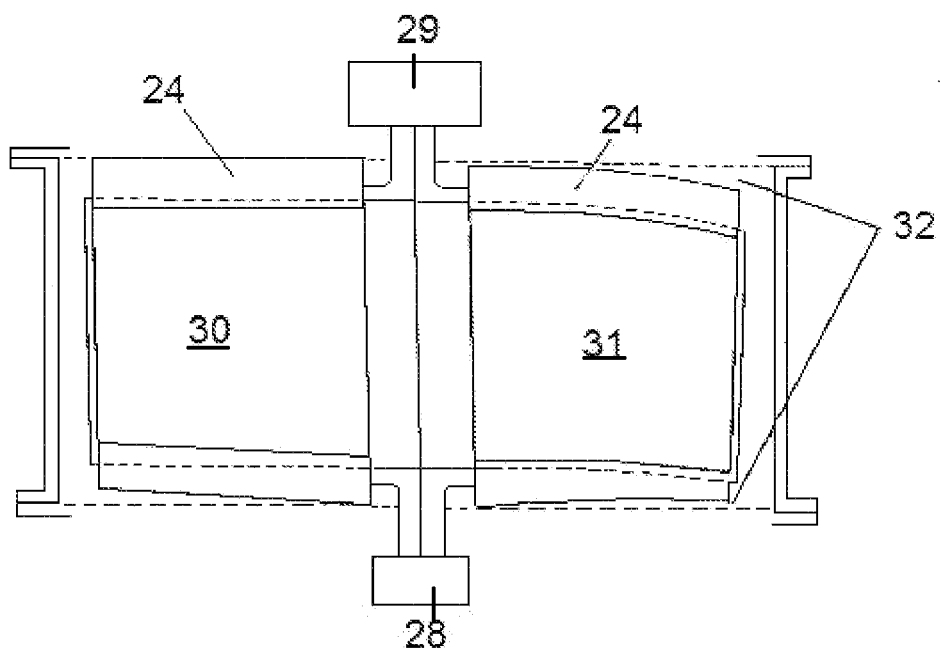
FIG. 4 is a cutaway view to illustrate deformation of the preheater's rotor in a traditional radial seal.

FIG. 4 is a cutaway view to illustrate deformation of the preheater's rotor in a traditional radial seal. The traditional radial seal is totally rigid, and a gap is produced between the sealing surface and the seal in a hot condition or normal operation, as can be seen in a hot condition under hot gas flow, identified by element 31. In FIG. 4, the current hot gas entering the preheater is indicated by element 21A. The cold condition under the cold air flow is denoted by element 30, and the hot condition under hot gas flow by element 31 for regular operation, where the rotor and as a result upper/lower seals 24 deform such that a clearance 32 is created between the seals 24 and the sealing surface (upper sealing surface (42A), not shown). The clearances 32 are where the high leaks typically occur with the traditional seals 24. A lower bearing 28 and an upper bearing 29 permit rotation of the rotor of the preheater.

Referring again to FIG. 2, from the total cold air stream 20A that enters into the preheater 12 through air section 18, a part leaks 23 (shown by arrows) to the gas section 19 via the clearances 32 formed by the traditional seals 24 because of the temperature effect and the pressure differential. This is because the pressure on the air side is higher than the pressure on the gas side, which deforms the seals 24 and plates (diaphragms).

Figure 5:
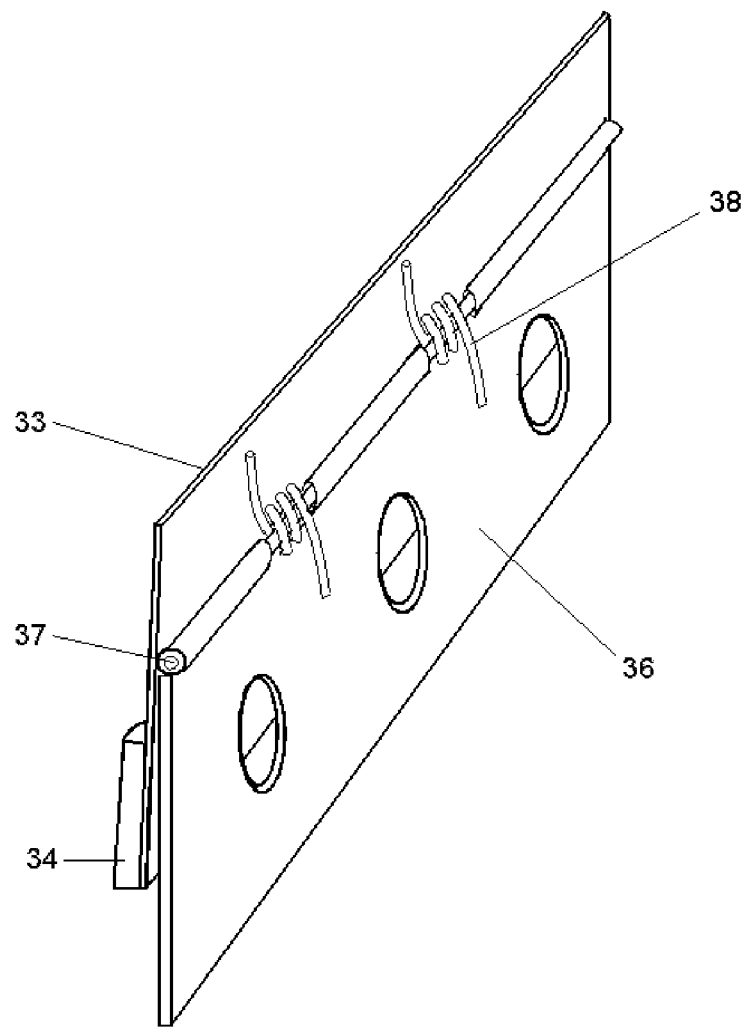
FIG. 5 is a perspective view of a forced oscillation radial seal according to the example embodiment.

FIG. 5 is a perspective view of the forced oscillation radial seal according to the example embodiment. The example forced oscillation radial seal (hereafter "forced oscillation seal") may be used on the top and low side of a vertical or vertical inverted preheater, but may also be used on a horizontal preheater. The forced oscillation seal includes a base 36 adapted to be attached to the diaphragms 3 (plates) in a fixed position. The base 36 has a first portion and a second free portion, the first portion fixedly attached to a lateral face of the diaphragms 3 adjacent to its edges. The forced oscillation seal includes a pivot system 37 attached to the second free portion of the seal. The pivot system 37 forces the forced oscillation seal to oscillate.

As shown in FIG. 5, the forced oscillation seal further includes a rigid sealing sheet 33. Rigid sealing sheet 33 includes a first free portion, an opposite second portion, and a central portion, the rigid sealing sheet 33 attached to the pivot system 37 at the central portion of the rigid sealing sheet 33. A counterweight 34 is attached to the rigid sealing sheet 33. The counterweight 34 forces the rigid sealing sheet 33 to reassume a vertical position after going through an upper sealing surface 42A (not shown in FIG. 5) of the center section. A counterweight attaching means 35 such as a weld joins the counterweight 34 and rigid sealing sheet 33.

Due to thermal expansion and contraction, the pivot system 37 can be altered, which causes the free portions of the rigid sealing sheet 33 to slowly oscillate. To prevent this undesirable slow oscillation of the free portions during thermal expansion and contraction, the forced oscillation seal includes a plurality of resilient means, such as springs 38. As will be seen in later figures, the springs 38 also provide an upward force to the upper seals and a downward force to the lower seals. Further, the employment of springs 38 in the forced oscillation seal is beneficial to prevent tapping or knocking of the pivotable rigid sealing sheet 33.

The rigid sealing sheet 33 can be made from any rigid suitable material, for example a steel sheet. The rigid sealing sheet 33 is intended to substantially maintain its form.

The pivot system 37 includes a base, for example a base formed by a hollow bar and a round bar joined to the oscillating base 36 and the diaphragm/plate 3 in order to allow a pivotable movement of the forced oscillation seal with respect to the plate 3, aided by the springs 38.

FIG. 6 is a side view of the forced oscillation seal upper side of a vertical or vertical inverted preheater, on its position and illustrating its typical calibration. In FIG. 6, an upper forced oscillation seal can be appreciated in a vertical or vertical inverted preheater mounted on its final position, i.e., attached to the upper end of the plate 3 (diaphragm), for example secured with fasteners such as screws and nuts 40 to a holding strip 41 and calibrated with an interference 43 in the form of an extension of the rigid sealing sheet 33. This way, when the rotor moves with temperature (which is it's normal operation), deformation in the rotor is produced. As a result, the seals come down together with the above-mentioned diaphragms 3, so that the forced oscillation seals pass tight to the upper sealing surface 42A of the center section in the rigid sealing sheet 33, ensuring sealing. After that, the forced oscillation seal moves beyond and out of the upper sealing surface 42A, and because of the counterweight 34 and springs 38 effect, it reassumes its original vertical position. This is why it is referred to as a forced oscillation seal.

FIG. 7 shows a side view of the forced oscillation seal lower side of a vertical or vertical inverted preheater, on its position and illustrating its typical calibration. Here, the counterweight 34 is attached on the sealing side, forms part of the seal and extend the life of the forced oscillation seal. The base 36 is attached to the plate 3 in a fixed position, for example using bolts and nuts 40, and it is able to form a seal per the gravity effect plus the force imparted by the spring 38, ensuring the forced oscillation movement and ability to be calibrated or replaced.

Figure 9:
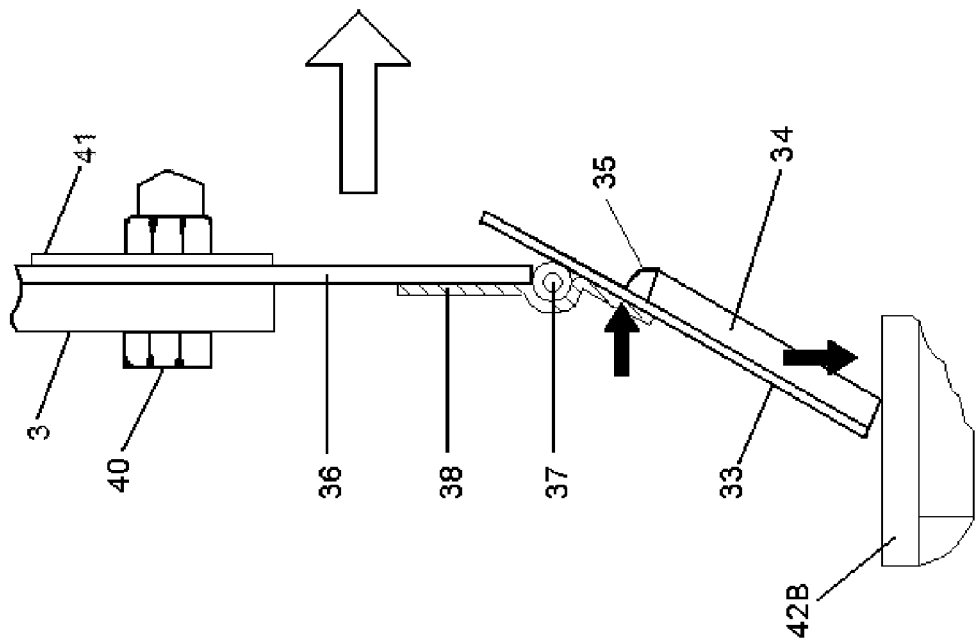
FIG. 9 shows the sealing action of the lower forced oscillation seal according to the example embodiment.
Figure 8:
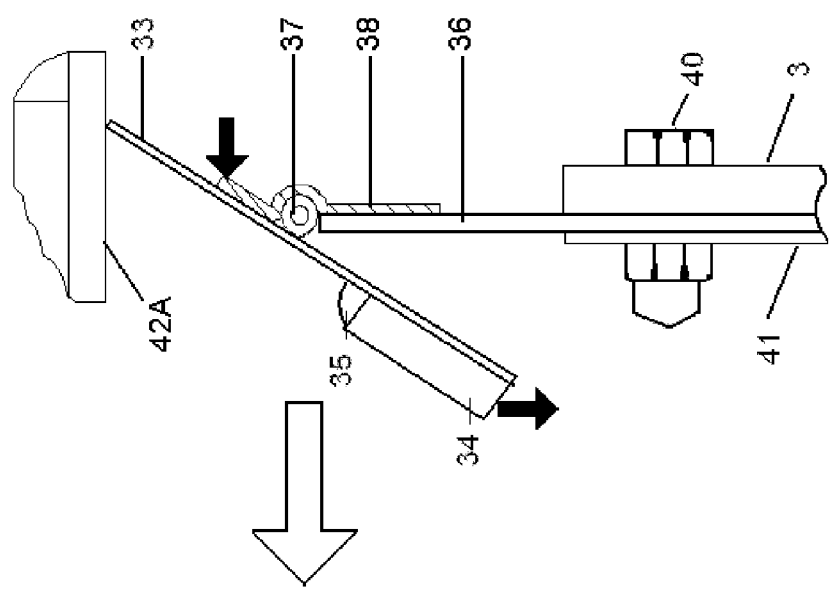
FIG. 8 shows the sealing action of the upper forced oscillation seal according to the example embodiment.

FIG. 8 shows the sealing action of the upper forced oscillation seal according to the example embodiment, and FIG. 9 shows the sealing action of the lower forced oscillation seal according to the example embodiment. Referring to FIG. 8, the end of the rigid sealing sheet 33 bears against the upper sealing surface 42A of the cover. In the upper seal of FIG. 8, the counterweight 34 provides a downward force which due to the pivot system 37 results in an upward force. Likewise, the spring 38 also provides an upward force; the counterweight 34, pivot system 37, and spring 38 collectively maintaining the end of the sealing sheet 33 in contact with and sliding on the upper sealing surface 42A.

Regarding the lower forced oscillation seal depicted in FIG. 9, the sealing sheet 33 and counterweight 34 together with the springs 38 exert a downward force that maintains the end of the rigid sealing sheet 33 and counterweight 34 on the lower sealing surface 42B.

Figure 10:
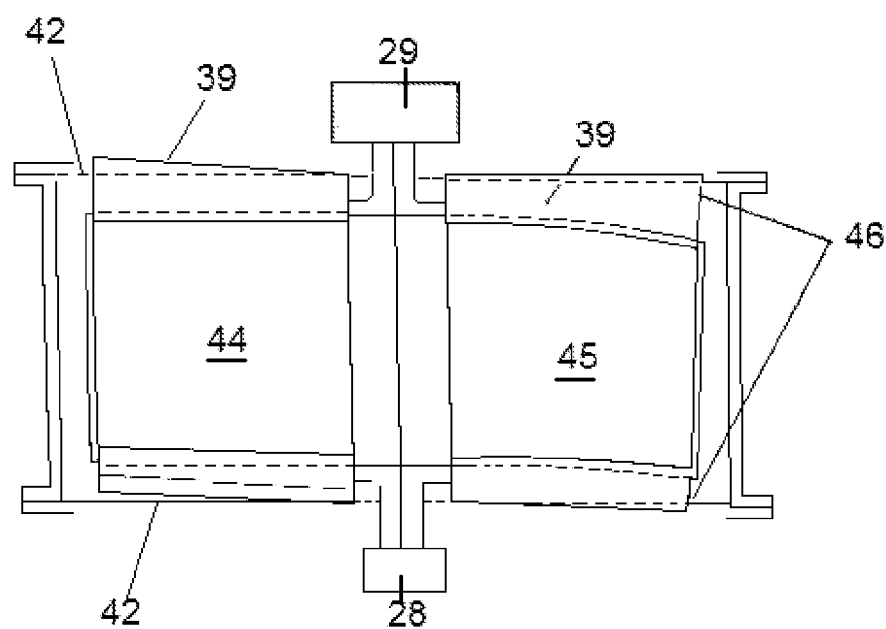
FIG. 10 is a cutaway view of a preheater that shows a cold condition and a hot condition, with the forced oscillation seals according to the example embodiment.

FIG. 10 is a cutaway view of a preheater that shows a cold condition and a hot condition, with the forced oscillation seals according to the example embodiment. In FIG. 10, there is shown a comparison of the cold condition 44 on a preheater with the example forced oscillation seals (denoted in FIG. 10 by element 39), overlapping or juxtaposing on a sealing surface 42. As can be seen, the clearance 46 between the forced oscillation seal 39 and sealing surface 42 is prevented under any condition, producing as a result leaks reduction and/or elimination.

For the hot condition 45 on the equipment, the performance of the forced oscillation seals is described below, for both upper and lower side, being noted, that in a regular condition of operation of a preheater with temperature, i.e., hot, the forced oscillation seals 39 maintain contact with the sealing surfaces 42, achieving the elimination of the air to gas radial outflows or leaks 23 on regenerative preheaters, being nowadays the sole design that can achieve this.

The example forced oscillation radial seal having been described, it follows that a method for preventing radial leaks in a regenerative air preheater containing rotatable radial plates having lower an upper edges, as shown and described herein, is foreseen which comprises, inter alia, installing, adjacent to the lower and upper edges of the plates, a forced oscillation radial seal as shown and described herein.

Moreover, it further follows that there is foreseen a method for reconditioning a regenerative air preheater containing rotatable radial plates having lower an upper edges, as shown and described herein, which comprises, inter alia, installing, adjacent to the lower and upper edges of the plates, a forced oscillation radial seal as shown and described herein.

With the use of a regenerative air preheater employing the forced oscillation seals as described in the above example embodiment, it is possible to realize savings from 800,000 USD to 3,000,000 USD, taking into account the boiler capacity where the regenerative air preheater is being used, as well as the price of the equipment, consumables and boiler operating conditions.

The example embodiment being thus described may be varied in many ways for a person skilled in the art. Such variations are not to be regarded as a departure from the spirit and scope of the described example embodiment, and all such modifications as would be obvious to one skilled in the art are considered to be included within the scope of the following claims.

I claim:

1. A forced oscillation radial seal to prevent leaks of air stream to a gas stream in regenerative air preheaters containing rotatable radial plates having upper and lower edges, comprising:
    a base with a first portion and a second free portion, the first portion fixedly attached to a lateral face of the plates adjacent to their upper and lower edges;
    a pivot system having an axis attached to the second free portion of the base,
    a rigid sealing sheet with a first free portion, an opposite second portion, and a central portion, the rigid sealing sheet attached at its central portion to the pivot system;
    a counterweight attached to the rigid sealing sheet so that the rigid sealing sheet reassumes a vertical position after forming a seal with a sealing surface, and
    a plurality of springs in contact with the rigid sealing sheet and the base along the axis of the pivot system that cooperate with the counterweights to force the seal to oscillate.

2. The forced oscillation radial seal of claim 1, wherein the counterweight is attached to the free first portion of the rigid sealing sheet.

3. The forced oscillation radial seal of claim 1, wherein the counterweight is attached to the second portion of the rigid sealing sheet.

4. A method for preventing radial leaks in a regenerative air preheater containing rotatable radial plates having upper and lower edges, comprising:
    providing a forced oscillation radial seal to prevent leaks of air stream to a gas stream in the regenerative air preheater, the forced oscillation radial seal comprising:
        a base with a first portion and a second free portion, the first portion fixedly attached to a lateral face of the plates adjacent to their upper and lower edges,
        a pivot system having an axis attached to the second free portion of the base,
        a rigid sealing sheet with a first free portion, an opposite second portion, and a central portion, the rigid sealing sheet attached at its central portion to the pivot system,
        a counterweight attached to the rigid sealing sheet so that the rigid sealing sheet reassumes a vertical position after forming a seal with a sealing surface, and a plurality of springs in contact with the rigid sealing sheet and the base along the axis of the pivot system that cooperate with the counterweights to force the seal to oscillate, and installing, adjacent to the upper and lower edges of the plates, the forced oscillation radial seal.

5. A method for reconditioning a regenerative air preheater containing rotatable radial plates having upper and lower edges, comprising:

providing a forced oscillation radial seal to prevent leaks of air stream to a gas stream in the regenerative air preheater, the forced oscillation radial seal comprising:

a base with a first portion and a second free portion, the first portion fixedly attached to a lateral face of the plates adjacent to their upper and lower edges, a pivot system having an axis attached to the second free portion of the base, a rigid sealing sheet with a first free portion, an opposite second portion, and a central portion, the rigid sealing sheet attached at its central portion to the pivot system, a counterweight attached to the rigid sealing sheet so that the rigid sealing sheet reassumes a vertical position after forming a seal with a sealing surface, and a plurality of springs in contact with the rigid sealing sheet and the base along the axis of the pivot system that cooperate with the counterweights to force the seal to oscillate, and installing, adjacent to the upper and lower edges of the plates, the forced oscillation radial seal.

* * * * *